No. 863,129. PATENTED AUG. 13, 1907.
E. B. ALLEN.
STOP MOTION DEVICE FOR SEWING MACHINES.
APPLICATION FILED OCT. 30, 1906.
6 SHEETS—SHEET 3.

Witnesses:

Inventor:
Edward B. Allen
By
Attorney.

No. 863,129. PATENTED AUG. 13, 1907.
E. B. ALLEN.
STOP MOTION DEVICE FOR SEWING MACHINES.
APPLICATION FILED OCT. 30, 1906.

6 SHEETS—SHEET 4.

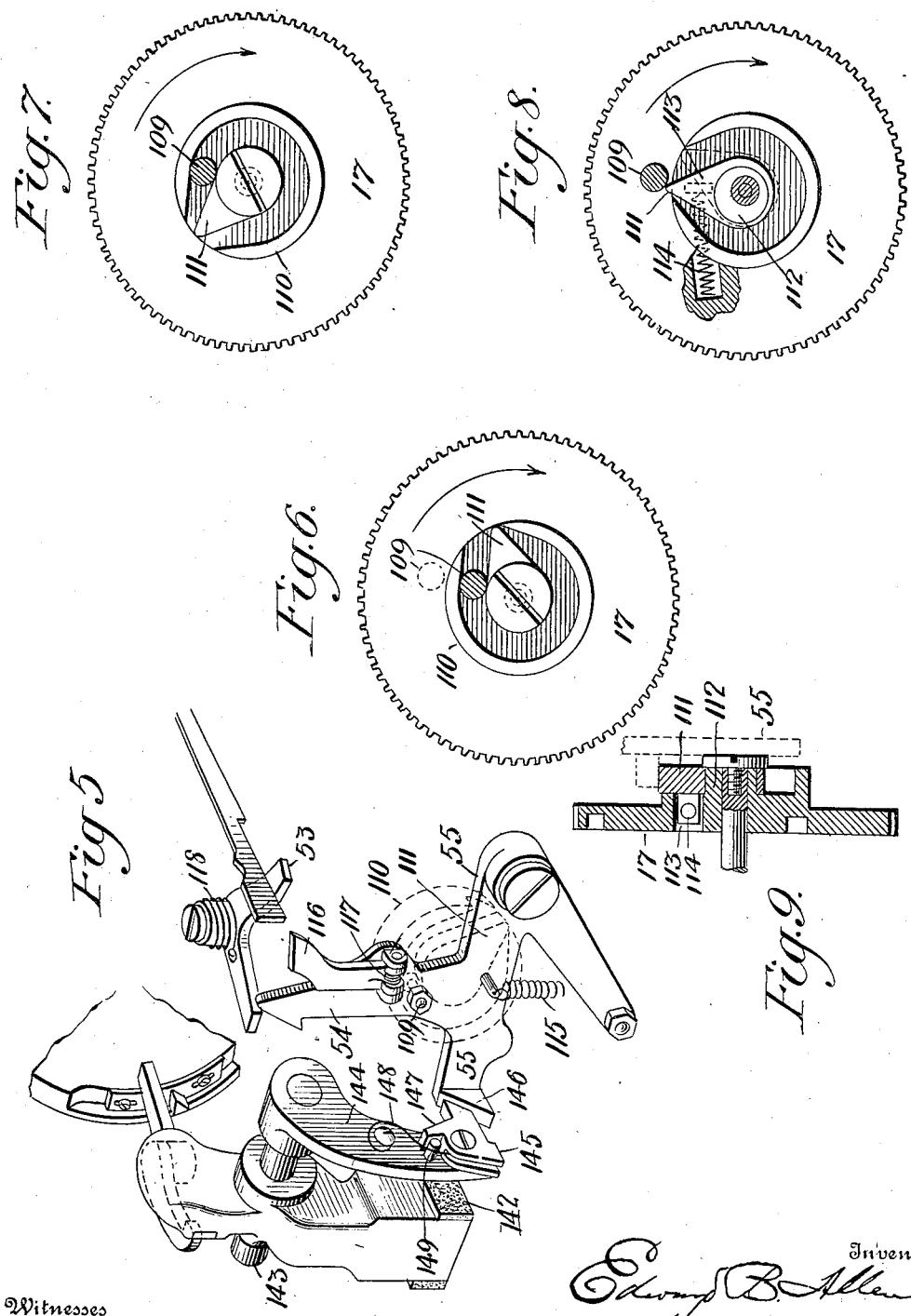

No. 863,129. PATENTED AUG. 13, 1907.
E. B. ALLEN.
STOP MOTION DEVICE FOR SEWING MACHINES.
APPLICATION FILED OCT. 30, 1906.
6 SHEETS—SHEET 6.
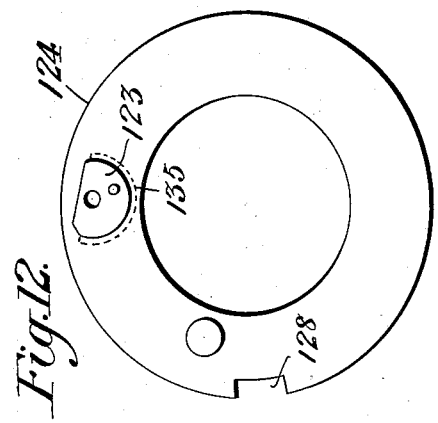
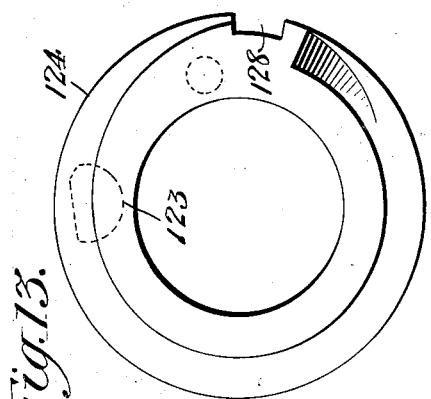
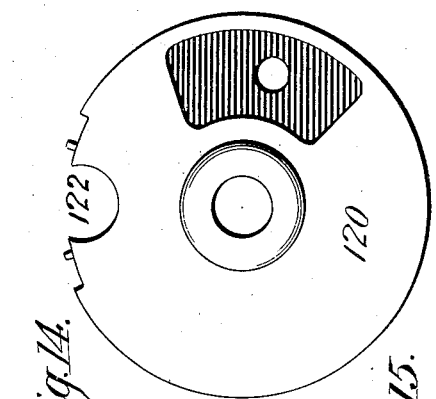
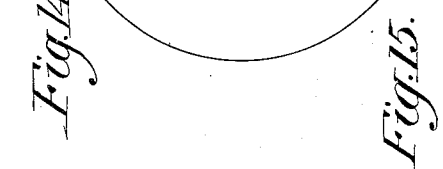
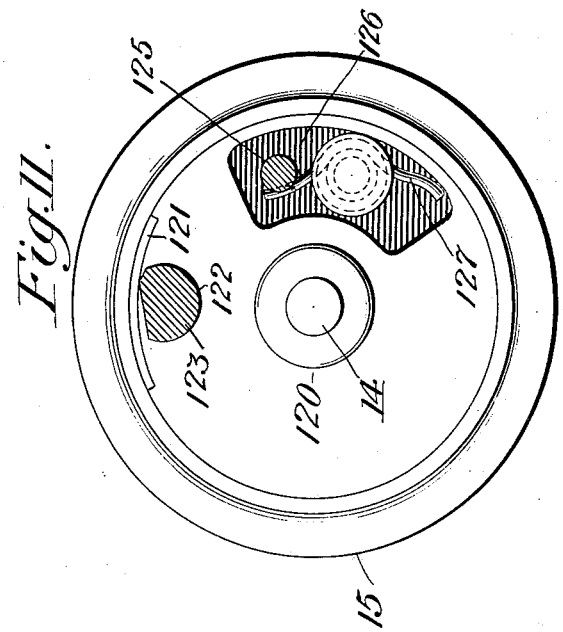
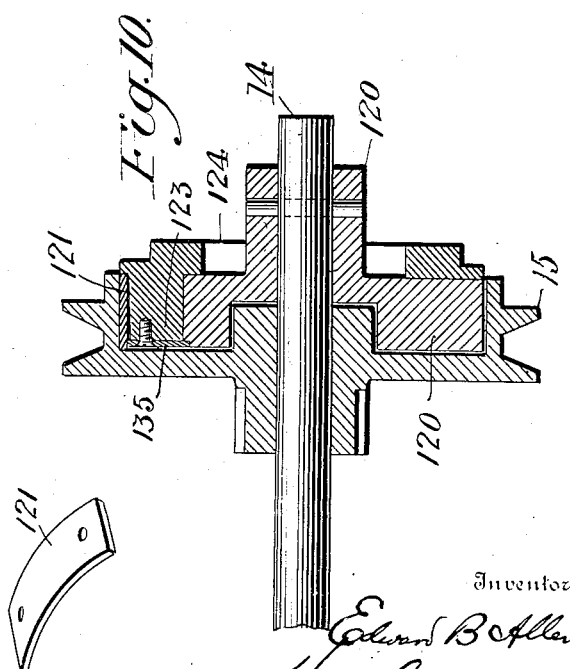
Witnesses
Inventor
Edward B Allen
By
Attorney.

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

STOP-MOTION DEVICE FOR SEWING-MACHINES.

No. 863,129.   Specification of Letters Patent.   Patented Aug. 13, 1907.

Original application filed March 7, 1906, Serial No. 304,732. Divided and this application filed October 30, 1906. Serial No. 341,202.

To all whom it may concern:

Be it known that I, EDWARD B. ALLEN, a citizen of the United States, formerly of Elizabeth, New Jersey, but now residing at Bridgeport, in the county of Fairfield and State of Connecticut, have invented or discovered certain new and useful Improvements in Stop-Motion Devices for Sewing-Machines, of which the following is a specification, reference being had therein to the accompanying drawings.

This invention relates to a start- and stop-motion device for sewing machines, and more especially for button-hole stitching machines, such, for example, as that fully shown and described in my application No. 304,732, filed March 7, 1906, and of which this application is a division.

Figure 1:
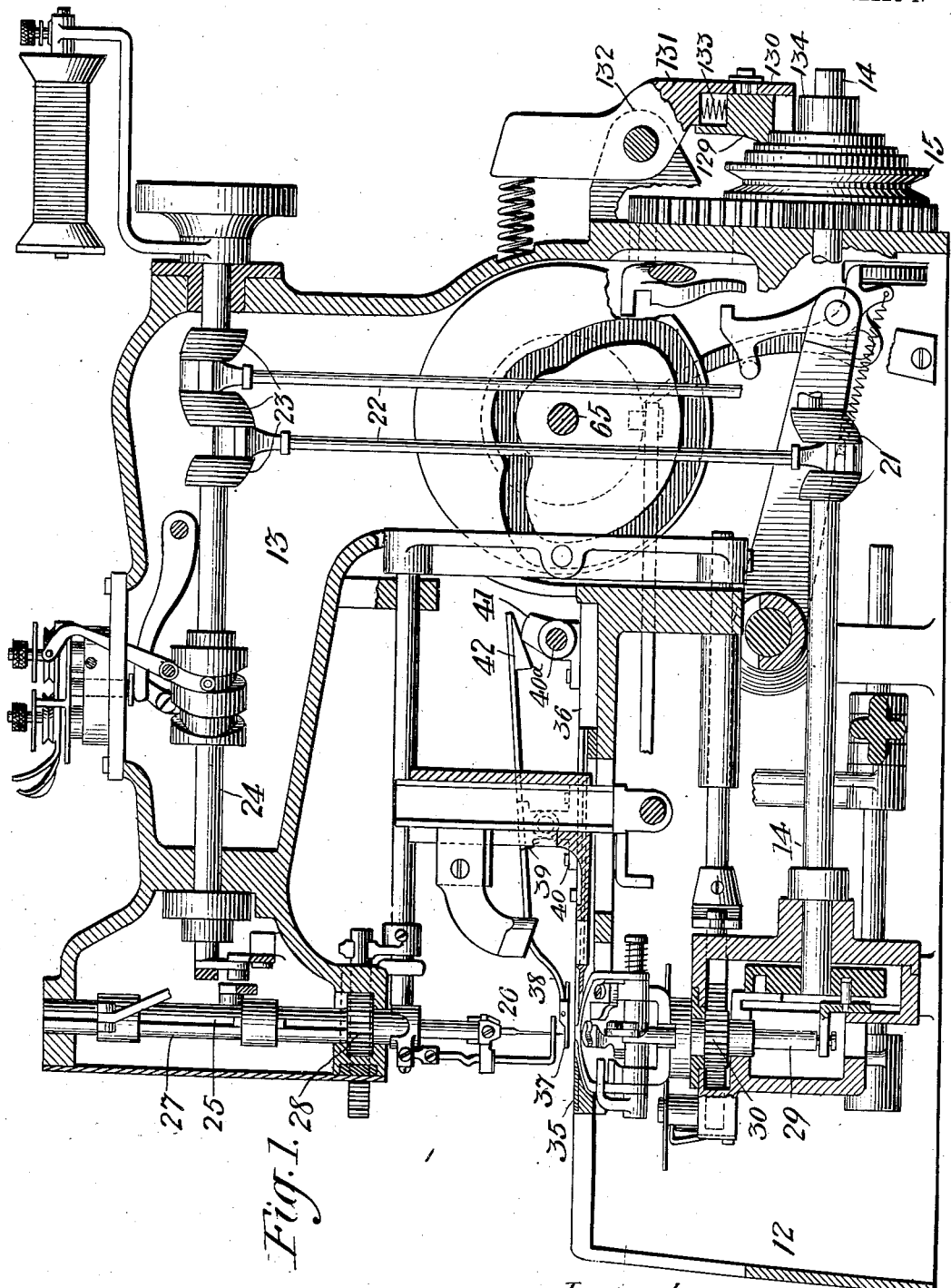
Figure 2:
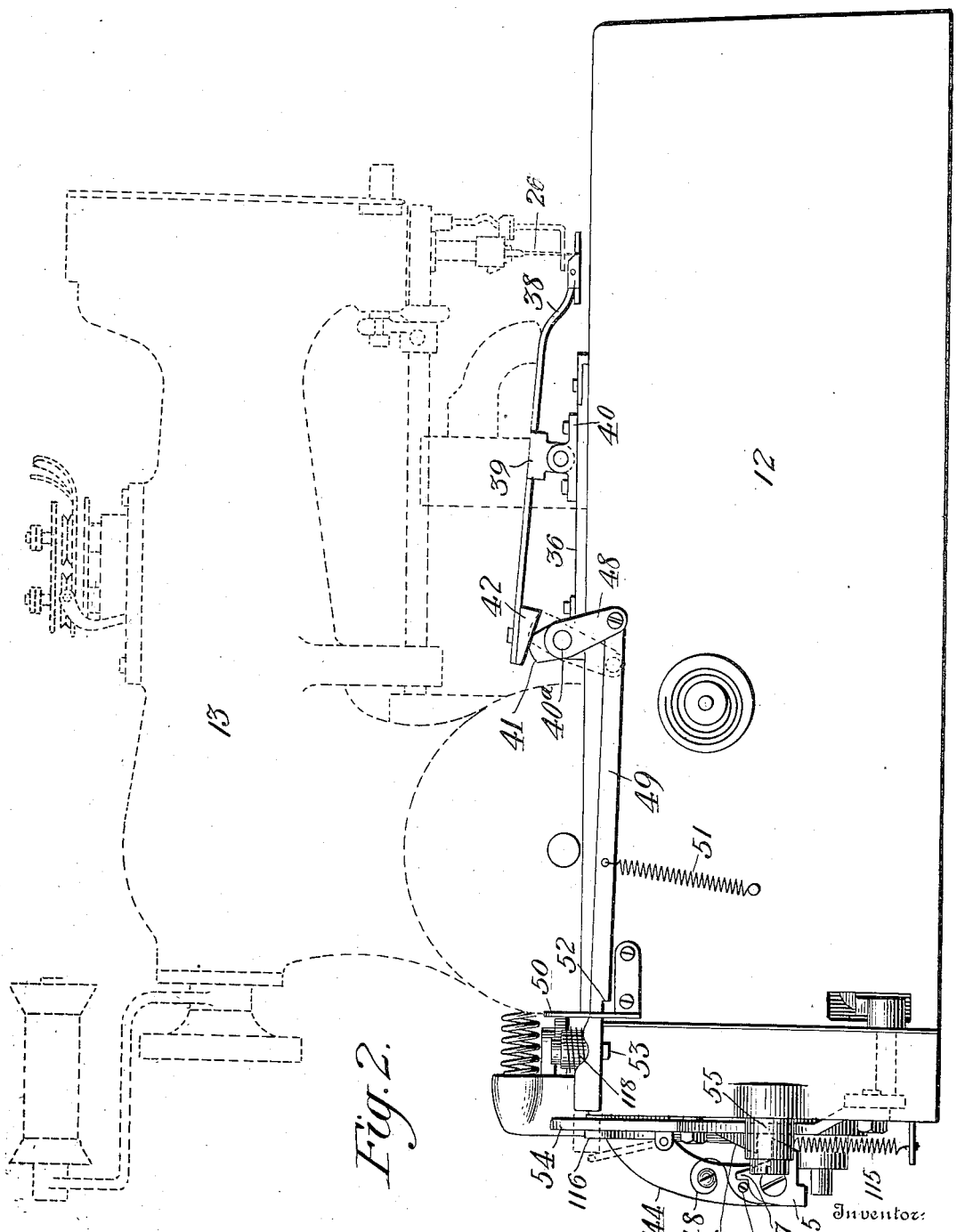
Figure 3:
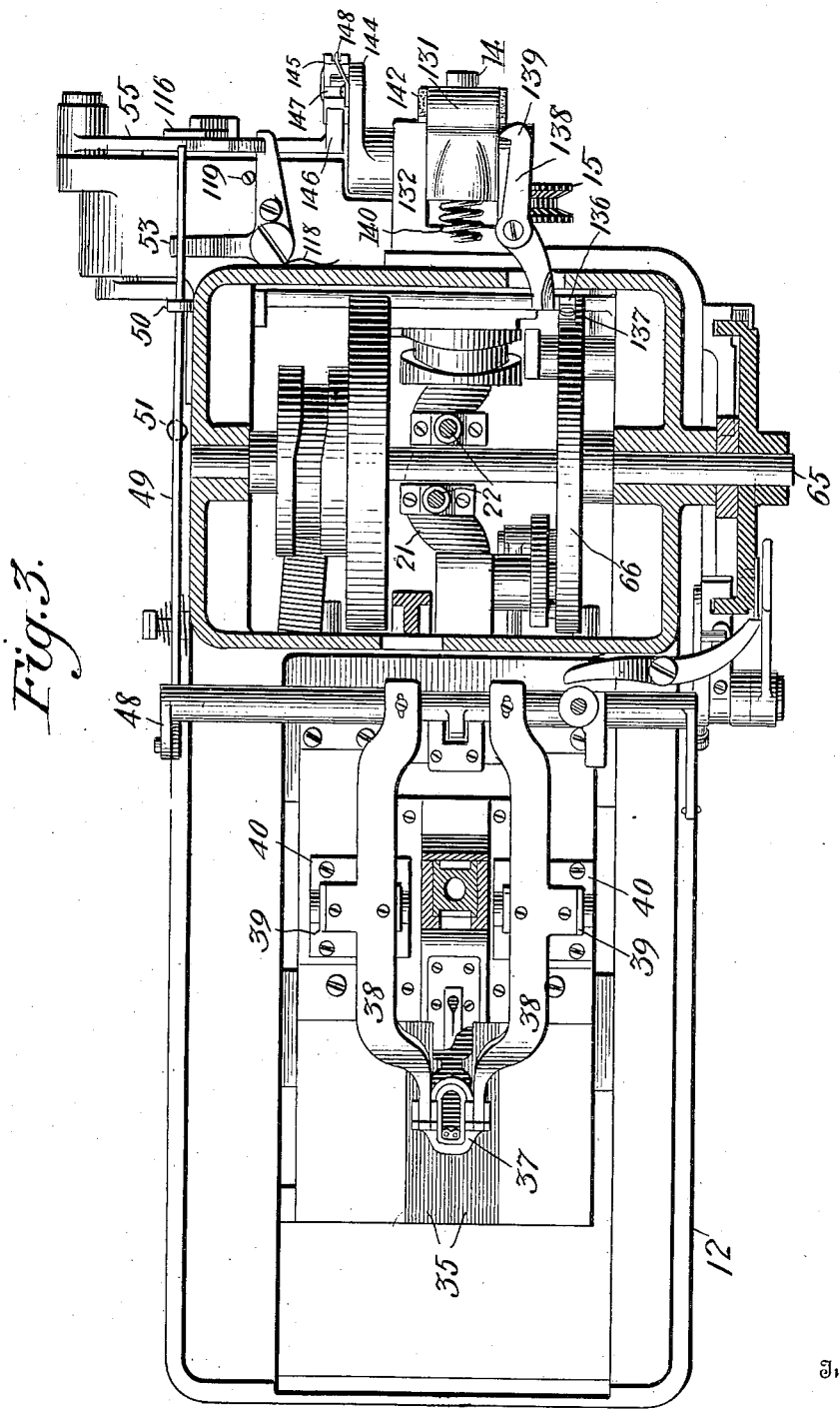
Figure 4:
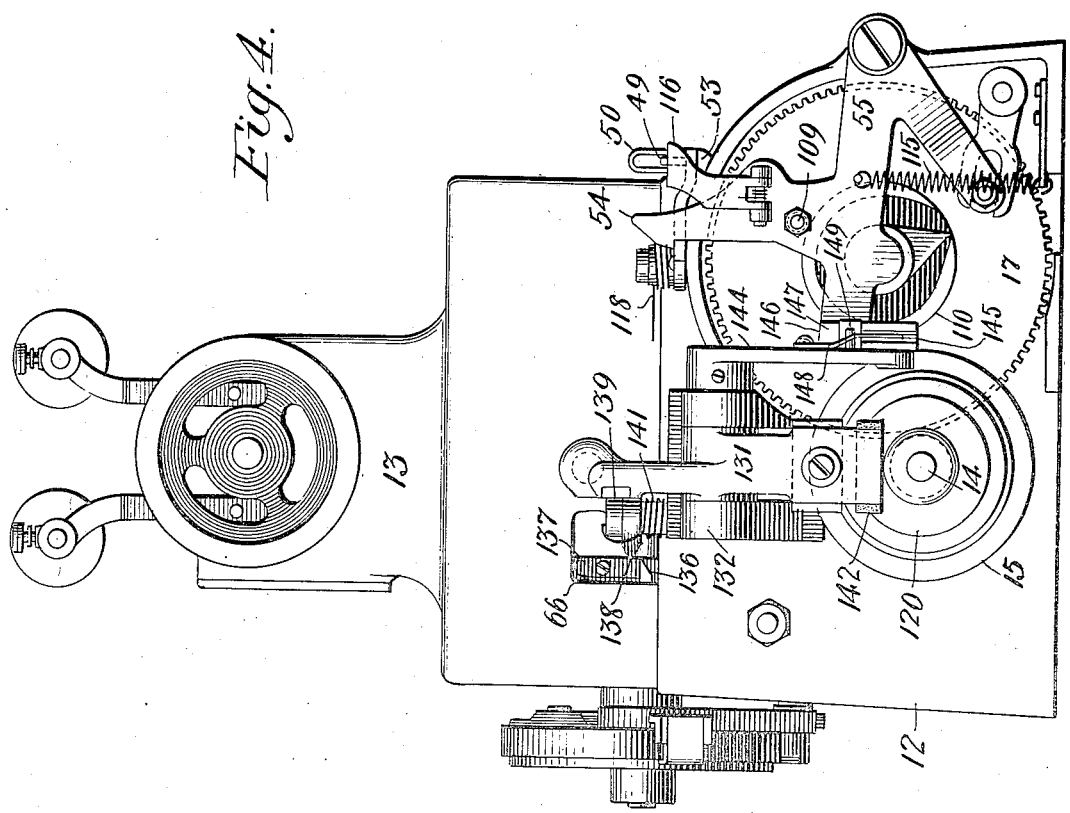

Referring to the drawings, Figure 1 is a vertical longitudinal section of a button-hole machine embodying the present invention. Fig. 2 is a side view of the same with the upper part of the frame in dotted lines. Fig. 3 is a horizontal sectional view of the same, looking down. Fig. 4 is a rear end view of the same. Fig. 5 is a detail perspective view of parts of the stop-motion device. Figs. 6 to 9, inclusive, are detail views of a continuously rotating wheel and the switch-tappet carried thereby, and Figs. 10 to 15, inclusive, are detail views of the start- and stop-motion clutch.

Referring to the drawings, 12 denotes the base of the machine and 13 the bracket-arm surmounting said base, said parts constituting the stationary frame of the machine on which the stitch-forming devices are preferably rotatively mounted, so as to be adapted to be turned, and on which the work-supporting and button-hole cutting devices are movably mounted. Journaled in the said base 12 is the main or driving shaft 14 on which is loosely mounted the driving pulley 15 having a suitable clutch connection with said shaft.

The driving shaft 14 is constructed with twin quartering cranks 21 connected by pitmen 22 with similar cranks 23 on the rotating needle-bar shaft 24 journaled in the upper part of the arm and provided at its forward end with cranks connected by pitmen with two out-of time needle-bars 25 carrying needles 26; said needle-bars being operated in the manner fully set forth in U. S. Patent No. 739,132, granted Sept. 15, 1903. The needle-bars 25 reciprocate vertically in a rotatable guide 27 suitably mounted in the head of the machine, as fully set forth in U. S. Patent No. 734,794, granted July 28, 1903, and said guide is provided with a pinion 28 by which it may be rotated.

The loop-taking devices coöperating with the needles 26 are operatively connected with the forward end of the shaft 14 and are preferably the same in construction and operation as the loop-taking devices fully shown and described in said U. S. Patent No. 734,794, said loop-taking devices being mounted on a rotatable carrier 29 provided with a pinion 30 by which it may be turned.

The upper plates or feet 37 of the work-holding clamp are carried at the forward ends of clamp-arms 38 attached to rocking blocks 39 pivotally mounted on plates or blocks 40 secured to the plates 36. Journaled in suitable bearings at the rear ends of the lower clamping plates 35 is a rock-shaft 40ª provided with cams 41 against which blocks 42 at the rear ends of the clamp arms 38 are pressed by suitable springs which serve to open the clamp by lifting the forward ends of said clamp arms when the clamp-closing cams on the rock-shaft 40ª are in such position as to permit the upper clamping-plates or feet 37 to be lifted by said springs.

The rock-shaft 40ª is provided at one end with an arm 48 to which is jointed the forward end of the bar 49 passing through an opening in a steadying and guiding bracket 50 secured to the base of the machine. The rear end of the bar 49 is held yieldingly downward by a spring 51, and said bar is provided on its under side with a shoulder 52 for engagement with one arm of a tripping lever 53 the other arm of which, when the machine is running, is engaged by a retaining hooked arm 54 of a starting lever 55 by which the machine may be set into operation.

The starting-lever 55 is provided with a stud 109 which, when the machine is running and when the hooked arm 54 of said starting lever is in engagement with the tripping lever 53, as shown in Fig. 4, will be above and entirely clear of the hub 110 formed on the constantly-running gear cam-wheel 17. The hub 110 is provided with a recess having a mouth which is open to one part of the periphery of said hub, said recess being for the reception of a switch-tappet 111 pivotally mounted on an eccentric sleeve 112 with which said wheel 17 is provided, the space around said switch-tappet, within said hub, affording a cam-track adapted to receive said stud 109. The switch-tappet 111 is provided at its inner side with a lug 113 against which presses a spring 114, housed within the wheel 17, to normally hold said switch-tappet in the position shown in Figs. 4 and 6; but when the tripping lever 53 is disengaged from the hooked arm 54 of the starting lever 55 the said starting lever will be drawn down by the spring 115 to bring the stud 109 into contact with the periphery of the hub 110; and as the wheel 17 is constantly rotating in the direction denoted by the arrows in Figs. 6, 7 and 8, said stud will now enter the track outside of the switch-tappet, as denoted in full lines in Fig. 6, lowering the starting lever 55 to the position shown in Fig. 5. The continued rotation of the wheel 17 brings the parts to the position shown in Figs. 7 and 8, and as the switch-tappet 111 engages the stud 109, as in Fig. 7, the said switch-tappet will lift the said stud clear of the hub 110 and in so doing said switch-tappet will yield against the stress of the spring 115 and eject the said stud from the open mouth in the cam-track in the said hub 110. (See Fig. 8). This lifting movement of the said stud raises said starting lever 55 to the position shown in Fig. 4, thereby starting the machine.

From the foregoing it will be understood that the operation of closing the clamp operates the tripping-lever 53 so as to release the starting lever 55.

For the purpose of releasing the tripping-lever 53 from the shoulder 52 of the tripping-bar 49, so that the said lever will be in a position to be engaged by the hooked arm 54 of the starting-lever 55 when said lever is lifted by the switch-tappet 111, as above described, the said arm 54 is provided with a spring-pressed lifting latch 116 the top of which is above the bottom of the rear end of the said tripping-bar when the shoulder 52 on said bar is in engagement with the said tripping-lever. Thus as the said tripping-bar is moved forward, when the work-clamp is closed, the rear end of said bar abuts against said latch and forces the same outward to the position shown in dotted lines in Fig. 2; but when the starting lever is moved downward, as above described, the said latch is returned by its spring 117 to its normal position relative to the hooked arm 54 by which it is carried; and when in such normal position said latch will be beneath the rear end of said tripping-bar when the starting lever is lowered. From this construction and arrangement of parts it results that when the starting lever is performing its upward or machine-starting movement, as will presently be described, the latch 116 will lift the rear end of the said tripping-bar so as to disengage the latter from the said tripping-lever and so that the said lever will then be instantly returned, by the torsional spring 118, to its normal position with one arm in engagement with the stop-pin 119; and at the last part of the upward movement of the starting lever the incline at the top of the hooked arm 54 rides past the retaining arm of the spring-pressed tripping lever so that the said retaining arm will now snap beneath the shoulder of the hook and thereby lock the starting lever in its raised position. It will thus be understood that after a single vibration of the starting lever the latter will be locked to prevent a second vibration thereof until said lever is next tripped by the opening of the clamp. When the work-clamp is opened to release the work, after a button-hole has been completed, the tripping-bar 54 is moved forward to the position shown in Figs. 2 and 3, and being thus disengaged from the lifting latch 116 said bar will be in position to perform its next tripping operation when the work-clamp is again closed.

The loose driving pulley 15, as hereinbefore stated, has a suitable clutch connection with the main or driving shaft 14, said clutch connection, in the present instance, comprising a clutch-wheel or disk 120 which is pinned or otherwise attached to said shaft to rotate therewith, the said clutch-wheel extending within said pulley which is suitably recessed or chambered for its reception. The clutch-wheel 120 is recessed at one portion of its periphery for the reception of a clutch-plate 121 interposed between said wheel and the wall of the chamber in the said loose pulley, said wheel also having a segmental recess 122, inside of said plate, for the reception of a cam projection 123 on a clutch-ring 124 which has a pivotal connection with the said clutch-wheel by means of said projection, so that the said clutch-ring may swing slightly relative to said clutch-wheel on said projection as a center or pivot, thus causing the cam or flattened outer portion of said projection to clamp said clutch-plate tightly against the wall of the chamber in the pulley 15 when the latter is to be connected to the driving shaft 14.

The clutch-ring 124 is provided with a pin 125 extending within a recess 126 in the clutch-wheel 120 and which recess also receives a spring 127 bearing against said pin 125 so as to force the parts into the clutching position in Fig. 11. The said clutch-ring 124 is provided at its periphery with a notch 128 for the reception of a lug or projection 129 on a vertically movable block 130 carried by the stop-motion lever 131 pivotally mounted in a bracket 132 on the base or frame of the machine; a spring 133 housed in a recess in said lever serving to press said block yieldingly downward, and the said clutch-ring being provided with an eccentric or cam-portion 134 to engage said lug or projection 129 to lift the same so that it can fall into said notch 128, to swing said clutch-ring slightly in opposition to the stress of the spring 127, to release the said clutch-plate when the stop-motion lever has been tripped and the machine is to be stopped. The clutch-ring 124 is connected with the clutch-wheel 120 by a small plate 135 attached to the cam projection 123 and slightly overlapping the eccentric circular portion of the latter circumferentially.

The intermittingly rotating work-clamp feeding cam-wheel 66, on the shaft 65, is provided with a tripping lug or projection 136 preferably carried by a plate 137 adjustably attached to said wheel; said lug or projection being arranged to engage the inner arm of a latch-lever 138 the outer arm of which is provided with a hook 139 to engage the stop-motion lever 131, when the machine is running, and prevent said lever from being moved to stopping position by its spring 140. A spring 141, acting on said latch-lever, normally presses said hook 139 towards said stop-motion lever, but when the inner arm of said latch-lever is engaged by said tripping lug or projection 136 the said hook will be disengaged from said stop-motion lever to release the latter so as to swing the stopping lug or projection 129, carried by said stop-motion lever, into position to engage the clutch-ring 124, and thus release the clutch, as hereinbefore indicated, for the stopping operation.

The stop-motion lever is provided with a friction pad 142, preferably of raw-hide or other suitable non-metallic material, which is arranged to be pressed into contact with the outer face of the clutch-ring 124 when the said stop-motion lever is first tripped, and thus retard the speed of rotation of the clutch-wheel prior to the final positive stop of said wheel, and which positive stop occurs when the lug or projection 129 enters the notch 128 in the said clutch-ring.

The stop-motion lever 131 is pivotally mounted in the bracket 132 by means of a rock-shaft 143 to which said lever is rigidly attached, and the said rock-shaft is provided with a starting arm 144 also rigidly attached to said shaft and carrying a pivoted dog 145 having an inclined inner face for engagement with the inclined outer face of a rigid projection 146 on the starting-lever 55. The said pivoted dog is provided with a lug 147 which is yieldingly pressed by a spring 148 against a stop-pin 149, and when the starting lever moves downward the said dog will yield or turn against the stress of said spring 148, and thus permit the rigid projection 146 on said starting-lever to pass by said dog without moving the starting arm 144; but when said starting lever is moved upward the incline on the said starting lever will engage the incline on the said dog (which is now held rigid by the said stop-pin 149) and thus force the starting-arm outward, such outward movement of said starting-arm swinging the lower arm of the stop-motion lever outward, thereby disengaging the lug or projection 129, carried by said arm, from the notch 128 in the clutch-ring 124 so as to allow the spring 127 to force the clutching parts into holding engagement with each other to set the machine in motion. As the lower arm of the stop-motion lever moves outward its upper arm moves inward so as to be engaged by the retaining hook of the latch-lever 138 which will then hold the said stop-motion lever in its inoperative position until the said latch-lever is again tripped by the lug or projection 136 on the feed wheel, at the completion of the next button-hole.

Having thus described my invention I claim and desire to secure by Letters Patent:—

1. In a button-hole stitching-machine, the combination with stitch-forming devices, of a continuously rotating wheel having a recessed part provided with an open mouth, a spring-pressed switch-tappet in said recessed part, a starting-lever having a stud to enter the cam-track in said recessed part afforded by the said switch-tappet, retaining and tripping means for said starting-lever, a start- and stop-motion device adapted to be tripped, to set the machine running, by said starting lever, and a work-clamp and connections whereby when said work-clamp is closed said starting lever will be released.

2. In a button-hole stitching-machine, the combination with stitch-forming devices, of a start- and stop-motion device for said stitch-forming devices, a continuously-rotating wheel having a recessed hub part provided with a radially opening mouth, a spring-pressed switch-tappet in said recessed part, a pin or stud to enter the cam-track afforded by the said switch-tappet in said recessed part, and means, operated from said pin or stud, for controlling said start- and stop-motion device for starting said stitch-forming devices into operation.

3. In a button-hole stitching machine, the combination with a stitch-forming mechanism, and a start- and stop-motion device comprising a starting lever provided with a stud or projection, of a continuously-running, spring-pressed switch-tappet arranged to engage said stud or projection and thereby operate said starting lever to set said stitch-forming mechanism into action.

4. In a button-hole stitching machine, the combination with a stitch-forming mechanism, of a start- and stop-motion mechanism for said stitch-forming mechanism comprising a starting-lever having a pin or stud, a continuously-rotating spring-pressed switch-tappet, and controlling means whereby said pin or stud may be operatively engaged with said switch-tappet when said stitch-forming mechanism is to be set into operation.

In testimony whereof I affix my signature, in presence of two witnesses.

EDWARD B. ALLEN.

Witnesses:
F. W. OSTROM,
E. L. TOLLES.